US007392476B2

United States Patent
Shoji et al.

(10) Patent No.: US 7,392,476 B2
(45) Date of Patent: Jun. 24, 2008

(54) IMAGE PRINTING SYSTEM, IMAGE PRINTING METHOD, AND IMAGE PRINTING PROGRAM

(75) Inventors: Akemi Shoji, Kawasaki (JP); Ryuta Namiki, Nishitokyo (JP)

(73) Assignee: Seiko Epson Corporation, Tokyo (JP)

( * ) Notice: Subject to any disclaimer, the term of this patent is extended or adjusted under 35 U.S.C. 154(b) by 756 days.

(21) Appl. No.: 10/729,899

(22) Filed: Dec. 9, 2003

(65) Prior Publication Data

US 2005/0036168 A1 Feb. 17, 2005

(30) Foreign Application Priority Data

Dec. 20, 2002 (JP) ............... 2002-370063

(51) Int. Cl.
G06F 15/16 (2006.01)
G06F 17/30 (2006.01)
H04N 1/46 (2006.01)

(52) U.S. Cl. ............... 715/255; 715/205; 715/234; 358/448; 358/538; 707/3

(58) Field of Classification Search ............... 715/513, 715/501.1, 527, 838, 205, 234, 255, 760; 358/1.15, 1.16, 448, 538; 399/182; 707/3
See application file for complete search history.

(56) References Cited

U.S. PATENT DOCUMENTS

| 5,687,332 | A   | * | 11/1997 | Kurahashi et al. | ........... 715/706 |
|-----------|-----|---|---------|------------------|--------------------|
| 6,166,826 | A   | * | 12/2000 | Yokoyama         | ............ 358/1.16 |
| 6,298,166 | B1  |   | 10/2001 | Ratnakar et al.  |                    |
| 6,522,418 | B2  | * | 2/2003  | Yokomizo et al.  | ........... 358/1.15 |
| 6,628,417 | B1  | * | 9/2003  | Naito et al.     | ............ 358/1.15 |
| 6,718,353 | B2  | * | 4/2004  | Hara et al.      | ............ 715/502 |
| 7,154,538 | B1  | * | 12/2006 | Fukasawa et al.  | ......... 348/211.3 |
| 7,180,618 | B2  | * | 2/2007  | Ueda et al.      | ............ 358/1.15 |
| 2002/0029242 | A1 | * | 3/2002 | Seto             | ............ 709/203 |
| 2002/0057454 | A1 |   | 5/2002 | Ueda et al.      |                    |
| 2004/0243635 | A1 | * | 12/2004 | Christophersen et al. | . 707/104.1 |

* cited by examiner

*Primary Examiner*—William Bashore
*Assistant Examiner*—MaiKhanh Nguyen
(74) *Attorney, Agent, or Firm*—Oliff & Berridge, PLC

(57) ABSTRACT

The image printing system of the present invention includes an image editing device that carries out editing and printing of images; a link processing device that allows obtaining a desired image by linking to a WWW server that provides the image to be edited and printed in the image editing device; a record search device that tabulates records of editing and printing processing that has been carried out using the image editing device on the images obtained from the WWW server; and a link destination selection device that selects link destinations in the link processing device based on the tabulation results of the record search device and reports this to the link processing device. The link processing device sets the link destinations based on the link destinations reported from the link destination selection device.

4 Claims, 4 Drawing Sheets

IMAGE PRINTING SYSTEM, IMAGE PRINTING METHOD, AND IMAGE PRINTING PROGRAM

BACKGROUND OF THE INVENTION

1. Field of the Invention

The present invention relates to an image printing system, an image printing method, and an image printing program wherein the printing of an image is carried out by using the Internet.

Priority is claimed on Japanese Patent Application No. 2002-370063, filed Dec. 20, 2002, the content of which is incorporated herein by reference.

2. Description of Related Art

Recently, the capacities of color printers have been dramatically improved, and at the same time, prices have declined. Thus, a user can purchase a color printer and print images that he has produced himself by using the color printer at a lower cost than requesting printed material from a professional printer.

However, in this case, there is the problem that for a non-professional user the production of the desired printed material is difficult. There are a variety of choices of printing environment, material used for in the printed material (photographic images, illustrations and the like), character fonts, editing, types of colors and the like, and for the user side to carry out all the layout production for these, heavy burdens are placed on the operator who carries out layout production and the computer system that is used. In particular, in the editing of image data, heavy processing steps become necessary, for example, to expand completely the compressed image data that represents the material to be used.

In order to solve this type of problem, a system has been proposed wherein an environment is built in which the layout operation is easily carried out using the image desired by the user, and an image that has been edited according to the layout operation is delivered to the user (refer to Citation 1, Japanese Unexamined Patent Application, First Publication No. 2002-244827). This system executes on the client a user editing application delivered by the server depending on the layout operation request from the client, and displays a screen for reading new image information not stored on the server. When the layout operation using the image data supplied from the server and the new image data is carried out, the image editing is carried out on the server based on the operation content, and this resulting edited image is delivered to the client.

In the current situation, the opportunities for using a color printer purchased by an individual are almost completely limited to printing New Year greeting cards and Christmas cards. At the same time, for the manufactures that make and sell the color printers, there is a need to expand the market for sales of consumable goods by increasing the opportunities for producing printed material and increasing the utilization of color printers purchased by individuals.

However, while the manufactures that make and sell color printers can provide systems such as the one disclosed in Citation 1 that can easily produce printed materials, there are limits to providing all the various types of content that will satisfy the needs of the users. At the same time, in recent years the Internet has been used to promote sales of products such as toys and food. The delivery content for introducing products has become widespread, and it is possible to introduce products with a high efficiency by having this content printed on the printers of individual users. However, for the manufacturers of toys, food and the like, there is the problem that carrying out production of printed material having a high quality requires much labor and cost.

In consideration of the problems described above, it is an object of the present invention to provide an image printing system, an image printing method, and an image printing program that increases the rate of utilization of printers, and at the same time makes possible carrying out highly efficient product introductions easily.

SUMMARY OF THE INVENTION

The image printing system of the present invention includes an image editing device that carries out the editing and printing of an image; a link processing device that makes possible retrieving a desired image by linking to a WWW server that provides the image to be edited and printed by the image editing device; a record search device that tabulates records of editing and printing processing that has been carried out using the image editing device on the images obtained from the WWW server; and a link selection device selects link origins in the link processing device based on the tabulated results of the record search device and reports this to the link processing device; wherein the link processing device sets the links based on the links reported by the link selection device.

According to this structure, the user can retrieve all types of images simply by connecting to a web site that can edit and print an image, and at the same time can easily edit and print the image under optimal conditions. It is possible to provide all types of content at no cost by linking to image providing sources that are operated by various businesses. The market for the sales of consumable goods can be expanded due to the increase in printing opportunities. For businesses that do not have optimal printing technology as well, a service that can print contents under optimal conditions can be easily provided simply by preparing images related to the products they handle, and thereby it becomes possible to carry out the introduction to products and the like at a high efficiency.

The image printing method of the present invention includes an image editing step in which the editing and printing of the image is carried out; a link processing step that allows retrieving a desired image by linking to a WWW server that provides the images to be edited and printed in the image editing step; a record search step that tabulates the records produced by the editing and printing process on the image retrieved from the WWW server by using the image editing device; and a step that selects a link in the link processing step based on the tabulation results of the record search step and sets the link origins in the link processing step based on these selected link origins.

The image printing program of the present invention provides an image editing process in which the editing and printing of the image is carried out; a link process that allows retrieving desired images by linking to a WWW server that provides the images to be edited and printed during image editing process; a record search that tabulates the records produced by the editing and printing process on the images retrieved from the WWW server by using the image editing process; and a process of selecting a link origins during the link processing process based on the tabulated results of the record search process and setting the link origins in the link process based on the selected link origins.

The record search device can tabulate users who have retrieved images from the WWW, the accessed images, and the access counts as records, and can search a WWW server that provides a plurality of accessed images having an access count higher than a predetermined value by using the users who retrieved a plurality of accessed images as the key, and output the records.

The record search device can also tabulate the dates and times that the images were retrieved from the WWW server as records, and can search a plurality of accessed images having an access count larger than a predetermined value and the WWW server that provides the plurality of accessed images by using the users who retrieved a plurality of accessed images on dates and times that fall within a predetermined range as a key, and output the records.

The present invention may further includes a memory device that stores user attribute information, and furthermore, the record search device can search a plurality of accessed images having an access count higher than a predetermined value and the WWW server that provides the plurality of accessed images by using the attribute information as a key, and output the records.

The record search device can tabulate as records the users who retrieved images from a WWW server, the edited and printed images that underwent the editing and printing process by using the image editing device, and the editing and printing count, and search the WWW server that provides a plurality of edited and printed images having an editing and printing count higher than a predetermined value by using as a key the users who carried out editing and printing process on the plurality of edited and printed images.

The record search device further tabulates as records the dates and times that editing and printing process was carried out by using the image editing device, and can search a plurality of edited and printed images having an editing and printing count higher than a predetermined value and the WWW server that provides and the plurality of edited and printed images by using as the key the users who edited and printed a plurality of edited and printed images on dates and times that falls within a predetermined range, and output the records.

The present invention further provides a memory device that stores the user attribute information, and furthermore the record search device can search a plurality of edited and printed images having an editing and printing count higher than a predetermined value and the WWW server that provides and the plurality of edited and printed images by using the attribute information as a key, and output the records.

According to the present invention, the users can retrieve all types of images simply by connecting to a web site that allows editing and printing images, and can easily edit and print the images under optimal conditions. By providing an image providing server and linking to web sites operated by businesses, it is possible to provide all types of contents at no cost. The market for the sale of consumable goods can be expanded due to the increase in printing opportunities. For businesses that do not have optimal printing technology as well, simply by preparing images related to the products they handle, a service that can print contents under optimal conditions can be easily provided, and thereby it becomes possible to carry out the introduction to products and the like at a high efficiency.

In addition, in the case that a user included in the record data accesses, edits and prints a plurality of images, it is possible to obtain information about which WWW server is being used. Therefore, by using information related to which other WWW servers operated by other business sectors the users who uses the WWW server that provides the images is using, material for planning cooperative business strategies can be developed.

In addition, it is possible to obtain trends related to accessed images, access counts, edited and printed images, editing and printing counts, and the users of an WWW server by using attribute information such as the user's age, sex, occupation, family structure and the like. Therefore, these trends can be used as data for business development.

DETAILED DESCRIPTION OF THE INVENTION

Figure 1:
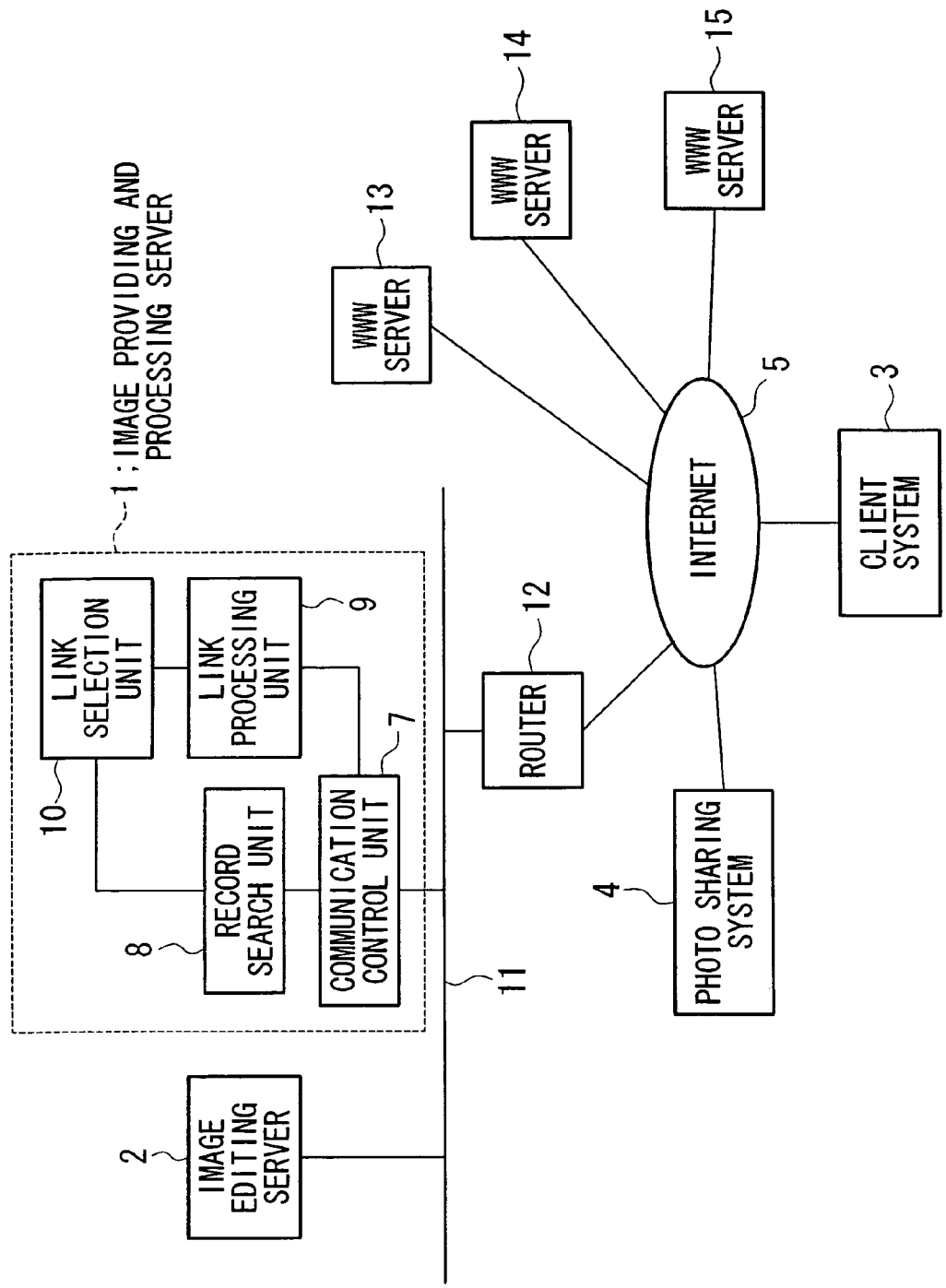
FIG. 1 is a block diagram showing the structure of an embodiment of the present invention.

Below, the image printing system according to the embodiments of the present invention will be explained with reference to the drawings. FIG. 1 is a block drawing that shows the composition of this embodiment. In this drawing, reference numeral 1 is an image providing and processing server that provides the images to be printed. Reference numeral 2 is an image editing server that supports the work of editing an image to obtain the desired printed image. Reference numeral 3 is a client system (below, referred to as the client) for printing the desired image, and is formed by the personal computer, color printer, and the like owned by an individual. Reference numeral 4 is a photo sharing system for maintaining images. Reference numeral 5 is a computer network such as the Internet, and here the Internet will be used in the explanation.

Reference numeral 7 is a communication control system that carries out the exchange of data via the network. Reference numeral 8 is a record search unit that searches records of printed images and downloaded images. Reference numeral 9 is a link processing unit that carries out link processing of the servers that provide images. Reference numeral 10 is a link destination selection unit that selects the server that provides images based on the records found in the record search unit 8. Reference numeral 11 is a computer network that is connected to a server operated by businesses making and selling printers. Reference numeral 12 is a router that connects the computer network 11 to the Internet 5. Reference numerals 13, 14, and 15 are WWW servers that provide images, and, for example, are operated by businesses that handle foods and variety goods. The images provided by these WWW servers include (1) images that use photographs, (2) images useful for daily life, (3) greeting card images, (4) hobby images, (5) images of original calling cards, (6) images for iron-on prints, (7) images of pets, (8) images of childcare and toys, (9) images for learning, (10) images of gifts, (11) images of ceremonial occasions, (12) bridal images, (13) images of companies, schools, groups, circles, autonomous associations, (14) images of products provided at events, and the like, and these images are provided at web sites on the WWW servers 13, 14, and 15. In FIG. 1, only three WWW servers are illustrated, but any WWW server that provides images can also be connected to the Internet 5.

Next, the basic operation of the editing and printing of images using the image editing server 2, the client system 3, and the photo sharing system 4 that are shown in FIG. 1 will be explained with reference to FIG. 3.

The image editing server 2 provides as main functions (1) the delivery of Java (registered trademark) applets for communication settings and the like that depend on the access requests from the client system 3, (2) delivery of image editing applications (below, in the expression "user editing AP", "AP" is an abbreviation of "application") that can be launched depending on the delivered Java applets, and (3) the execution of each type of process based on communication with the client system 3 that executes the delivered Java applets and user editing APs. A Java applet is a type of program that is made using the Java language developed by Sun Microsystems. This Java applet is executed by a Web browser that includes a Java Virtual Machine (below, referred to as a "Java VM").

Each of the processes described above includes a process for providing image data that represents the content of the material required by the client system 3, an editing process that depends the operation result of the user on this image data, and a delivery process for the edited image produced thereby.

The client system 3 is operated by the user, and provides as main functions (1) transmission of access requests and the like to the image editing server 2, and (2) execution of Java applets and the user editing AP delivered from the image editing server 2. By executing the Java applets and the user editing APs, in cooperation with the image editing server 2, it is possible to carry out, for example, requests for material for image editing, display the provided material and image data for supporting the image processing operation (below, referred to as a "layout operation") for image editing, transmission of the operation results that show the layout operation from the operator, who is the user, and printing of the edited image data (the edited image) received from the image editing server 2.

In particular, this client system 3 can realize an environment in which, in addition to image data provided by the image editing server 2, it is possible to obtain the desired image data from a plurality of other paths, and the operation of laying this out along with the image data provided by the image editing server 2 is possible.

Hereinafter, in addition to the processing operation of a typical image, the expression "layout operation" also includes the content of the image itself as it is, and the operation of adding other images, characters, or symbols to this image.

The photo sharing system 4 is a computer that provides image data stored in advance in one's own system via the Internet 5 and receives the registration thereof.

The image data maintained in this photo sharing system 4 includes public images provided without condition to the request origin for public use and private images that are provided to particular users registered in advance or to each of these users for private use.

Figure 3:
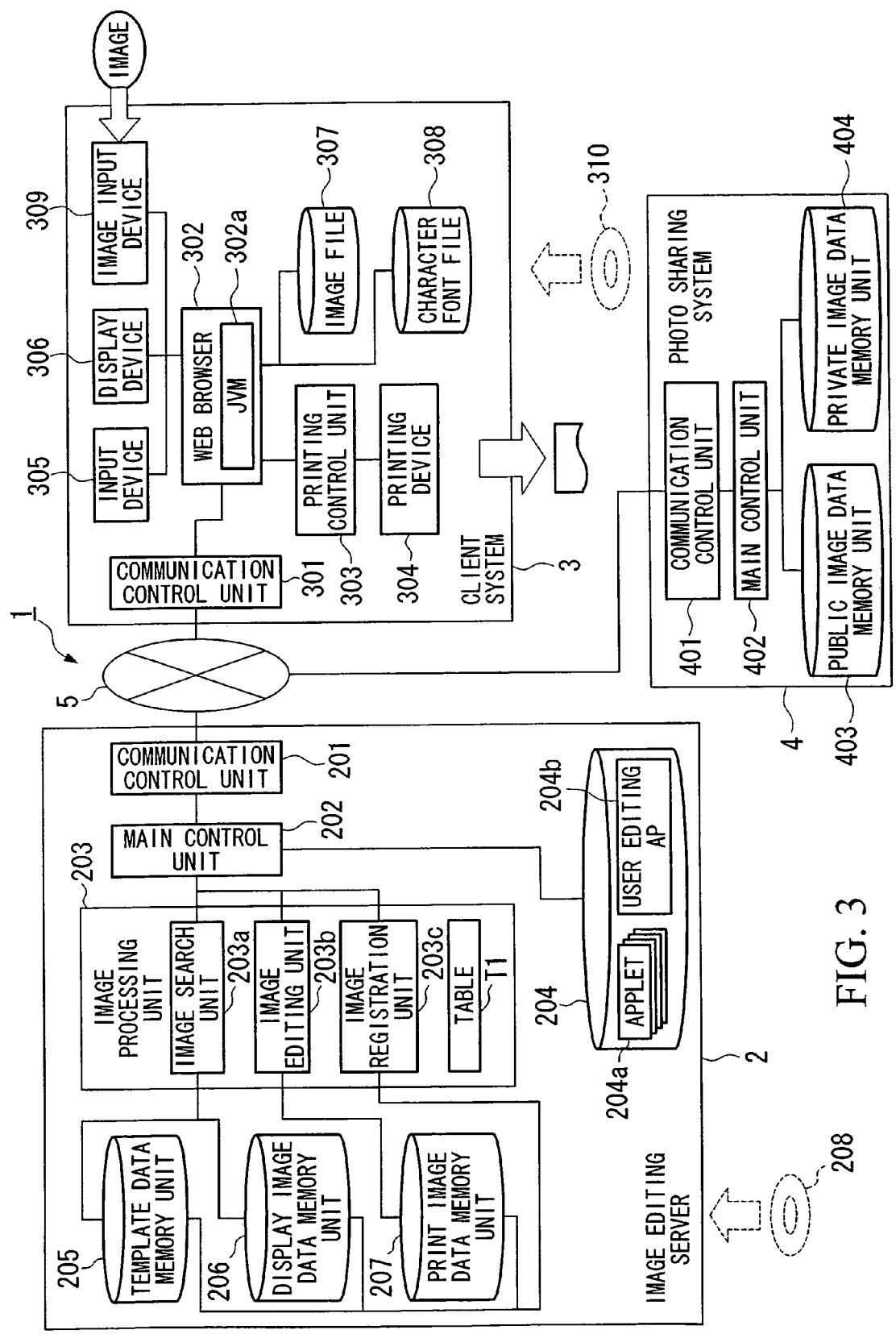
FIG. 3 is a block diagram showing the structure of the image editing server 2, the client system 3, and the photograph sharing system 4 shown in FIG. 1.

For convenience, FIG. 3 shows only one client system 3, but in this embodiment it is assumed that a plurality of client systems 3 can be connected to the Internet 5.

Next, the configuration of the image editing server 2 will be explained. The image editing server 2 is a computer having a communication function, and is formed by the CPU (central processing unit) thereof appropriately reading and executing predetermined programs. It includes a communication control unit 201, a main control unit 202, an image processing unit 203, a memory unit 204, a template data memory unit 205, a display image data memory unit 206, and a print image data memory unit 207. The computer program is recorded, for example, on an external memory medium (not illustrated) such as a hard disk drive or the like, or on a removable recording medium such as a CD-ROM (compact disk read-only-memory) 208.

The communication control unit 201 controls communication that is carried out in order to transmit and receive data between the Internet 5 and the main control unit 202 according to predetermined protocols.

The main control unit 202 controls the overall operation of the image editing server 2. In particular, by implementing the present invention, an environment is built on the image editing server 2 wherein each of the processing sequences in the communication control unit 201, the image processing unit 203, and the memory unit 204 are controlled, and, depending on access requests, delivery of Java applets and user editing APs are carried out. In addition, the layout operation and the processes necessary for the support thereof are carried out in the image processing unit 203 and the client system 3.

The image processing unit 203 executes each of the processes that are applied to the image data based on the control of the main control unit 202. Explained in more detail, the image processing unit 203 contains the functions of an image search unit 203a, an image editing unit 203b, and an image registration unit 203c, and further, provides a table T1.

The image search unit 203a searches templates and display image data according to a template number that specifies the template that has been designated among the templates, which are samples for the layout production processing, and a material number for specifying the material required when presenting the image, and searches templates and display image data according to the characteristic data given by a key word or the like by referring to the table T1.

The image editing unit 203b edits the print image data according to the result of the layout operation carried out by the user on the client system 3. At this time, the image editing unit 203b uses technology that positions or superimposes material without completely expanding the compressed image data. The technology disclosed in Japanese Unexamined Patent Application, First Publication No. Hei 11-331847 can be used for this technology.

The image registration unit 203c carries out processing for registering the image data provided by the client system 3. Characteristic data for characterizing materials designated by material numbers is stored in the Table T1. This characteristic data may comprise, for example, keywords. This characteristic data is provided for each material number that is unambiguously assigned to each material in order to represent the image data stored in the display image data memory unit 206 and the print image data memory unit 207. Furthermore, table T1 maintains the same data for templates stored in the template data memory unit 205.

A plurality of different Java applet sets (below, referred to as a "Java applet group") and user editing APs 204b are stored in the memory unit 204. The Java applet 204a is included among the Java applet group. The Java applet 204a is delivered to and executed on the client system 3 to support the layout operation on the client system 3, which is the delivery destination.

The user editing AP 204b is an application program downloaded by the client system 3. By executing this application program on the client system 3, an environment is realized in which image data is obtained through a plurality of paths, not just from the image editing server 2, and the layout operation is carried out on the images represented by this image data on a the same screen.

The template data memory unit 205 stores the data for the templates described above. The templates include framing information and background image information. A template number is assigned to each of the templates in order to identify each one uniquely.

The display image data memory unit 206 stores image data (below, referred to as "display image information") for material that is being displayed in the display apparatus of the client system 3 during the layout operation processing.

The print image data memory unit 207 stores the image data (below, referred to as "print image data") for material that is being used in the editing processing of the image editing server 2. Image data that represents the same material is respectively maintained in the display image data memory unit 206 and the print image data memory unit 207. The difference between display image data and print image data is the amount of the data.

Specifically, even when the materials are the same, the amount of the display image data displayed is using a small size in comparison to the print image data, and thus the area it occupies on the screen is also small. This is so that when the layout operation is carried out on the client system 3, no load is applied to the system. What are known as "thumbnails" can be used for that is here called display image data.

The print image data is maintained in the print image data memory unit 207 according to compression formats such as JPEG (Joint Photographic Expert Group) or GIF (Graphics Interchange Format).

An example of the configuration of the client system 3 will be explained. The client system 3 can be formed by using a personal computer (PC).

In the PC, at least a printing device 304, an input device 305, a display device 306, and an image input device 309 are connected, and therein, an image file 307 and a print font file 308 are stored. Furthermore, the CPU in the PC provides the functions of a communication control unit 301, a Web browser 302, and a printing control unit 303, which are formed by appropriately reading and executing predetermined computer programs.

The communication control unit 301 controls the communication according to predetermined protocols for transmission and reception of data carried out between the Internet 5 and the Web browser 302.

The Web browser 302 includes a Java VM 302a, which has the capacity to execute Java applets. Microsoft's "Internet Explorer" and Netscape's "Netscape Navigator" are appropriate as the Web browser 302. In the Web browser 302, each of the processes realized by executing the Java applet 204a and the user editing AP 204b, which are supplied by the image editor server 2, will be described below.

The print control unit 303 converts the edited image supplied from the Web browser 302 into printing data compatible with the printing device 304, and supplies this to the printing device 304. The printing device 304 is a device that prints on paper and outputs the edited image that has been converted to printing data, and the user having a client system 3 can print on paper of the desired size. The input device 305 is a mouse, keyboard, pen input device or the like, and receives commands from the user that operates the client system 3. The display device 306 displays the templates described above and other data to the user who operates the client system 3. It is possible to use a flat panel display such as an LCD (Liquid Crystal Display) as the display device 306.

The image file 307 stores original image data produced on the client system 3 and image data read from a scanner or the like.

The character font file 308 stores data that is represented by various character fonts obtained from other devices or the Internet 5, in addition to the original character fonts produced on the client system 3.

The image input device 309 is a device for inputting images that are not stored in the image file 307, and for example, a scanner or digital camera can be used.

Next, configuration of the photo sharing system 4 will be explained. The photo sharing system 4 is also a computer having a communication capacity, and the CPU provides the functions of a communication control unit 401, a main control unit 402, a public image data memory unit 403, and a private image data memory unit 404, which are formed by the CPU thereof appropriately reading and executing predetermined computer programs.

The communication control unit 401 controls communication carried out in order to transmit and receive data between the Internet 5 and the main control unit 402 according to predetermined protocols.

The main control unit 402 provides as needed public image data to the client system 3 that requests providing the image data, and when a user who is operating the client system 3 is recognized by predetermined authentication processing, he carries out control to provide the private image data described above. When providing this private image data, before providing the image data itself, control is carried out for confirmation by using image data such as thumbnails, which have a small amount of data that does not place a load on the client system 3.

The public image data memory unit 403 stores public image data described above, which is provided to the request origin that requests the image be provided without conditions.

The private image data memory unit 404 stores users who have registered in advance and private image data after ensuring security for each of these users.

The following is an example of the use and configuration of the public image data memory unit 404.

Among amateurs, there are photographers and CG (computer graphics) creators having a high level of skill that wish to present their works on the Internet 5, but do not possess the skills for producing what is called a home page, such as an understanding of HTML (HyperText Markup Language). In addition, because of limitations of providers relating to the providing and managing of home pages, for example, they do not have the opportunity to sell their own works. These people can use the present invention. Preferably these people can give priority to efforts towards production of their works, rather than efforts towards production of a home page.

By "photo" sharing, it becomes possible to collect image data (works) having the same character and engage in mutual evaluation easily, and it also becomes possible to attract the attention of critics, which rarely occurs with individual home pages.

A use and configuration of the private image data memory unit 404 can be one wherein, for example, registered users or groups use a personal photo album.

Figure 4:
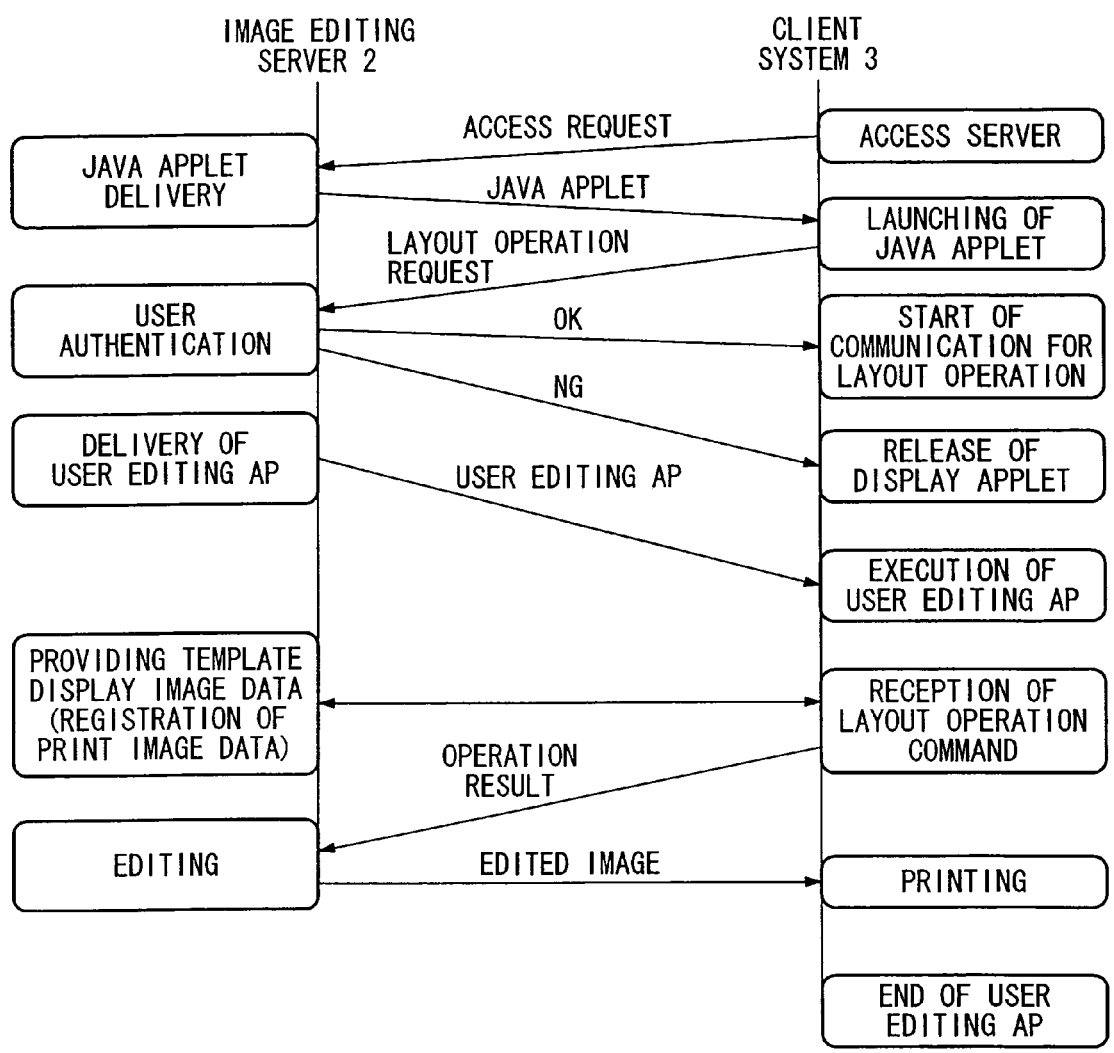
FIG. 4 is a sequence diagram showing the operation of the system shown in FIG. 3.

FIG. 4 shows the sequence for transmission and reception of various data carried out between the image editing server 2 and the client system 3.

First, the user makes an access request to the image editing server 2 by operating the client system 3. Depending on the access request, the image editing server 2 reads out a Java applet 204a stored in the memory unit 204, and delivers it to the client system 3 that is the access request origin.

The client system 3 that receives the Java applet 204a launches and executes it using Java VM 302. In this embodiment, after launching the Java applet 204a, processing for user authentication is executed. For example, the client system 3 makes a request to the image editing server 2 to start the layout operation (layout operation request), and at the same time, receives and transmits an input such as a previously assigned password.

Based on data such as the received password, the image editing server 2 determines whether or not the user of the client system 3 who has requested the start of the layout operation is the legitimate user to whom the password has been assigned, and returns the result.

In the case that the user is not legitimate, this outcome is displayed on the display device 30 of the client system 3, and the delivered applet is released.

In the case that the user is legitimate, the user editing AP 204 is delivered to the client system 3 by the image editing server 2. The client system 3 downloads and executes this user editing AP 204b. Thereby, an execution environment for the processing operation of the image by the user is built on the client system 3.

On the client system 3, when the process operation command for the image from the user is received, data transmission and reception is carried out as many times as necessary between the Java applet 204a executed on the client system 3 and the image editing server 2. For example, the conditions for the material input from the input device 305 of the client system 3, which represent which material will be used and how it will be used, are transmitted to the image editing server 2. The image editing server 2 specifies the display image data that shows material whose characteristic data (keywords) has a high relevance to these conditions for the material by searching, and transmits them to the client system 3.

On the client system 3, an environment is built for a processing operation for making composites of material (images) received from the image editing server 2, material (images) of one's own (including those input at the time using a scanner or the like), and images (public images and private images) maintained in the photo sharing system 4. Specifically, in this environment, in the case that an address (URL) for the photo sharing system 4 has been embedded or a link has been pasted in the editing screen on the Web browser and during the layout operation (for example, making composite images) a public image or a private image is necessary, the object public image or private image can be easily located, and it becomes possible to read and use these images.

When the layout operation on the client system 3 has been completed, the report of this completion and the operated content are reported to the image editing server 2.

The image editing server 2 receives this reported data, and among the received data, edits the print image data according to the operated content. The print image data obtained by this editing is returned to the client system 3.

When the client system 3 receives the print image data returned from the image editing server 2, the print device 304 is controlled by the print control unit 303, and printing on paper is carried out based on the print image data. Completion of the printing on paper causes the execution of the user editing AP 204b to end.

Figure 2:
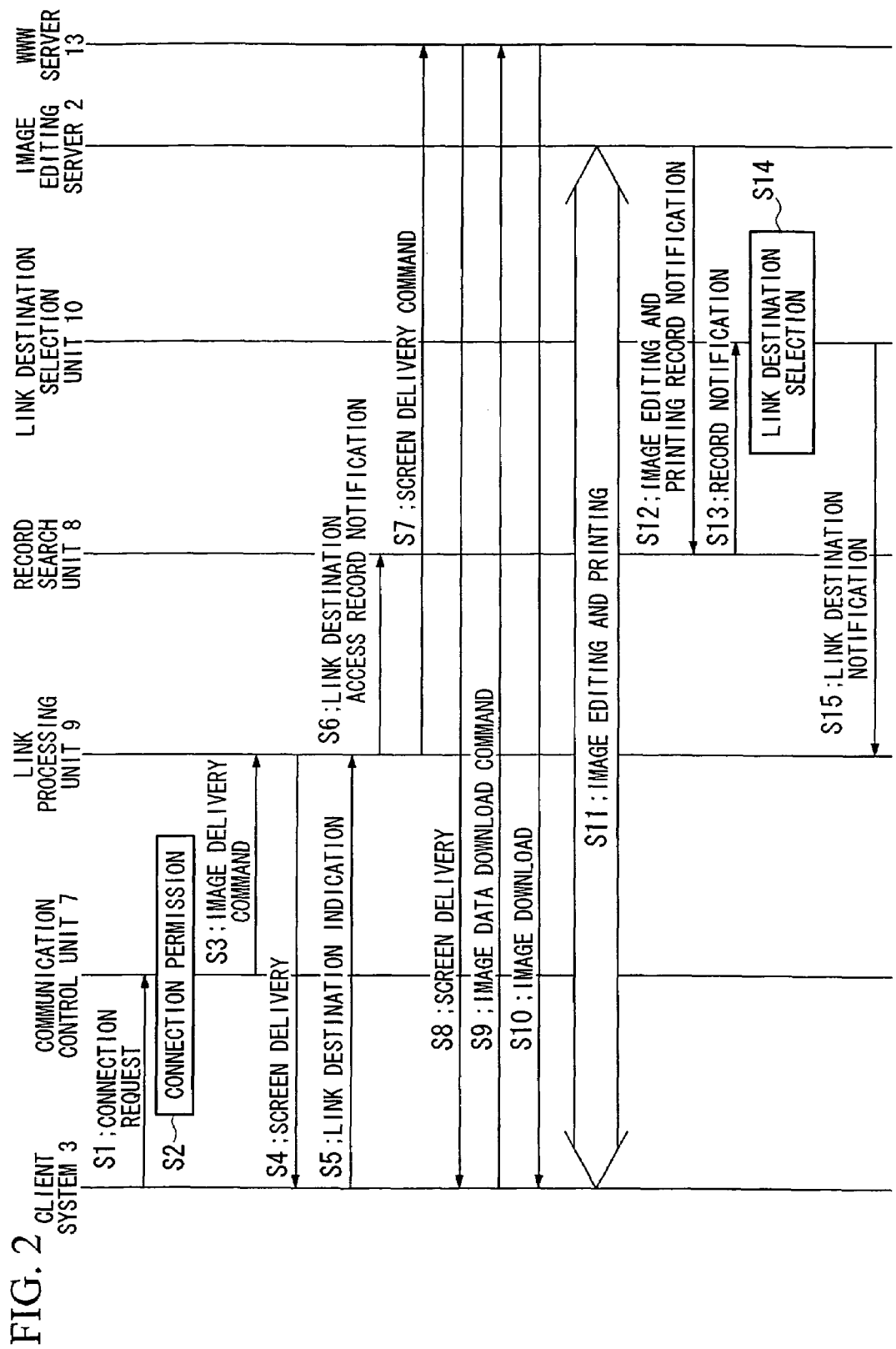
FIG. 2 is a sequence diagram showing the operation of the system shown in FIG. 1.

Next, the operation of the system shown in FIG. 1 will be explained with reference to FIG. 2.

First, when a connection request is issued from the client system 3 (step S1), authentication of the client is carried out by the communication control unit 7, and connection is permitted (step S2). Then the communication control unit 7 issues a command to send a screen to the link processing unit 9. Upon reception thereof, the link processing unit 9 delivers a screen for carrying out image selection to the client system 3 (step S4). In this screen, icons or the like for the web sites providing each of the images described above are included. The user indicates the link destination by selecting on the client system 3 the web site that provides the desired image from among the icons (step S5). The link processing unit 9 reports the selected link destination to the record search unit 8. Upon reception thereof, the record search unit 8 stores the reported link destination internally. The memory of this link destination is stored as a record that refers at least to the provided image.

Next, when the link destination has been indicated by the client system 3, the link processing unit 9 issues an image delivery command to the WWW server (here, WWW server 13) maintaining the link destination. Upon reception thereof, the WWW web server 13 transmits the screen for selecting the provided images to the client system 3 (step S8). In this screen, samples of the provided images are included, and these can be enlarged on the screen. The user selects the desired images from among these images, and commands the download of the image data (step S9). On reception thereof, the WWW server 13 downloads the data of the selected image (step S10). Thereby, the selected images are downloaded to the client system 3. These images are, for example, dress patterns or the like for paper crafts provided by a toy manufacturer, and the assembled and printed dress patterns form an image of a completed doll, such as a character sold by the toy manufacturer.

Next, the user carries out the editing and printing of the downloaded image (step S11). The editing and printing of the image is carried out by using the functions in the image editing server 2 that have been explained above. Thereby, printing of the selected image is carried out in the printing device 304 included on the client system 3 of the user. When the editing and printing of the image have been completed, the image editing server 2 notifies the record search unit 8 that the editing and printing of the images have completed (step S12). Upon reception thereof, the record search internally unit 8 stores the fact that the editing and printing of the images have been completed.

Next, the record search unit 8 tabulates the record data stored internally for each passage of a predetermined time interval (for example, one month), and reports this to the link destination selection unit 19 (step S13). The reported data here is data that indicates how many times each user has accessed a certain type of image and how many times the image was edited and printed.

Upon reception thereof, the link destination selection unit 10 transmits an electronic mail notifying each of the WWW servers 13, 14, and 15 about the record data. Upon reception thereof, each of the operators of the WWW severs 13, 14, and 15 updates the content of images provided based on this email, and providing images related to new products becomes possible. The image providing and processing server 1 is notified about the updating of the content of the provided images and the possibility of the providing of new images by email. The operator of the image providing and processing server 1 that has received this email selects the URL of the new link destination and inputs the URL by an input device (not illustrated) (step S14). Upon reception thereof, the link destination selection unit 10 notifies the link processing unit 9 about the link destination that has been input (step S15). Thereby, the new URL is added to the link destination processing unit 9.

By this type of operation, the user can obtain all types of images simply by connecting to a web site that allows the editing and printing of images, and at the same time, can easily carry out editing and printing of the image under optimal conditions. By providing the image providing and processing server 1 and linking to web sites operated by each business, it is possible to provide all types of content without incurring any cost. It is possible to expand the market for the sale of consumable goods because the opportunities for printing are increased. Even for businesses that do not possess optimal printing technology, it becomes possible to carry out the introduction of products and the like at high efficiency because a service in which content is printed under optimal conditions simply by preparing images related to the products that are handled can be easily provided.

The image print processing can be carried out by recording a program for realizing the functions of the processing units in FIG. 1 on a computer readable recording medium and reading the program recorded on this medium into a computer system and executing it. Here, "computer system" denotes a system that includes and OS and hardware such as peripheral devices. "Computer system" includes the WWW system that provides a home page providing environment (or display environment). "Computer readable recording medium" includes memory devices, for example, removable media such as flexible disks, magneto-optical disks, ROMs, CD-ROMs, and hard disks that are built into a computer system. Furthermore, "computer readable recording medium" includes a medium that maintain a program temporarily, such as the volatile memory (RAM) in the computer systems that serve as servers and clients when the program is delivered via a network such as the Internet, or a communication circuit such as telephone circuit.

The program described above can be transmitted from a computer system that stores this program in a memory device or the like to another computer system by a transmission medium or by transmission waves that propagate through the transmission medium. Here, the "transmission medium" that transmits a program denotes a medium having a capacity to transmit data over a network (communication network) such as the Internet or over a communication circuit (communication line) such as a telephone circuit. The program described above can be a program for realizing a portion of the functions described above. Furthermore, the program can be one that realizes the functions described above in combination with programs already recorded on a computer system, known as difference files (difference programs or patches).

Second Embodiment

Below, a second embodiment of the present invention will be explained. The image printing system of the present embodiment differs from the first embodiment on the point that the present embodiment is configured such that record data is used and output data that is useful for business strategies. Specifically, in the present embodiment of the image printing system, the record search unit 8 analyzes whether or not a user included in the record data reported to the operator of the WWW server has used images, such as accessed images or edit and print images, linked to a certain WWW server, and thereby analyses whether the user would be interested in other types of businesses, and provides material that is useful for planning cooperative business strategies with other types of business.

As described above, the record search unit 8 tabulates as record information "user, accessed images, access count, edit and print images, and the edit and print count".

In the present embodiment, furthermore, the record search unit 8 uses as a key users who obtain a plurality of accessed images to search a plurality of accessed images having an access count that is greater than a predetermined value and at the same time searches WWW servers that provide each of the plurality of accessed images and outputs the results, or the record search unit 8 searches WWW servers that provide accessed images having an access count greater than a predetermined value and WWW servers other than these WWW servers that provide accessed images having the greatest access count, and outputs the results.

The operators of the plurality of WWW servers obtained as a result of the search are notified about the operators of the plurality of WWW servers that are indicated by the search results. In such a configuration, businesses that have used the image system can propose businesses that can be carried out cooperatively from the image providing and processing server side (the image print system operator).

For example, in the case that a WWW server that is the link destination for an image provided by a television art program and a WWW server that is the link destination for an image provided by an interior business are both output as the result of the search, a proposal mail containing a comment such as, "We should exploit the image data printed by this image print system in both businesses to expand our mutual business opportunities" would be transmitted to both parties.

In a modified example, the record search unit 8 can further tabulate as a record the dates and times the image was obtained by the WWW server. In this case, the record search unit 8 uses as a key the users who accessed the plurality of accessed images on dates and times within a predetermined range, and searches a plurality of accessed images having an access count that is greater than a predetermined value, and at the same time searches WWW servers that provide each of the plurality of accessed images, and outputs the results.

Using such a structure, WWW servers that provide images that are simultaneously accessed by a user are obtained, and the operators of the plurality of WWW servers indicated by the search results are reported to the operators of the plurality of WWW servers obtained as search results.

The conditions for searching the WWW servers are not limited to the accessed images or the access count, but can also use edited and printed images and the edit and print count.

In this case, the record search unit 8 tabulates as records the users that obtained the images from the WWW server, the edited and printed images that were edited and processed using the image editing unit 203*b*, and the edit and print count, and at the same time, using as a key the users that edited and printed the plurality of edited and printed images, search WWW servers that provide each of the plurality of edited and printed images having an edit and print count that is greater than a predetermined value.

In the case of limiting the conditions to images that are simultaneously edited and printed, the record search unit 8 further tabulates as a record the dates and times that the editing and printing was carried out using the image editing unit 203*b*, and at the same time, using as a key the users that carried out the editing and printing processing of the image at dates and times within a predetermined range, search a plurality of edited and printed images having an edit and print count that is greater than a predetermined value, and at the same time, search the WWW servers that provide each of the plurality of edited and printed images, and output the results.

In this manner, the record search unit 8 analyzes whether the users included in the record data reported to the operators of the WWW servers use images such as accessed images linked to a certain server, and thereby analyses whether a user would be interested in other types of business to produce material useful in cooperative businesses with other types of businesses.

The method of using the tabulated record data is not limited thereby, and for example, providing a server data memory unit that stores attribute data for users on the image editing server 2, using this user attribute data, and analyzing the record data can also be considered.

For example, using as a key the attribute data (age, sex, occupation, family structure or the like) stored in the user data memory unit, the record search unit 8 can search the plurality of accessed images having an access count that is greater than a predetermined value or search WWW servers that provide each of the plurality of images, and output the results, or using the attribute data as a key, the record search unit 8 can search edited and printed images having an edit and print count that is greater than a predetermined value or search WWW servers that provide each of the plurality of edited and printed images, and output the results.

Using such a structure, the operator of a WWW server can be notified about material for quantitatively determining a combination of which users and which images, in other words, the combination of businesses, indicated by the WWW server that provide the images in which the users may be interested.

Specifically, tabulated data related to what type of images are accessed according to age, generation, sex, occupation, and family structure can be output. Producing a graph of each unit of the tabulated data (age, generation, sex, occupation, and family structure, or a combination thereof) can be considered as an output format, and in this manner, it is possible to deduce trends, and the data can be used as reference for business development.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image printing system comprising:
an image editing device that carries out editing and printing of images;
a link processing device that allows obtaining a desired image by linking to a WWW server that provides the image to be edited and printed in said image editing device;
a record search device that tabulates records of editing and printing processing that has been carried out using said image editing device on the images obtained from said WWW server, said records including at least one of a first data that indicates how many times each user has accessed a certain type of image and a second data that indicates how many times the image was edited and printed;
a link destination selection device that selects link destinations in said link processing device based on the tabulation results of said record search device and reports this to said link processing device; and
a memory device that stores attribute data of users who have accessed images, wherein
said link processing device sets the link destinations based on the link destinations reported from said link destination selection device, said records include said first data, and
said record search device searches accessed images which have been accessed by the users belonging to a predetermined attribute within a predetermined range of dates and times, and selects images, which have an access count that is greater than a predetermined value, from said accessed images based on the access counts corresponding to said accessed images, respectively.

2. An image processing method comprising:
an image editing step of carrying out editing and printing of an image;
a link processing step of obtaining a desired image by linking to a WWW server that provides the image to be edited and printed in the said image editing step;
a record step of tabulating records of editing and printing processing that has been carried out by using said image editing step on the image obtained from said WWW server, said records including at least one of a first data that indicates how many times each user has accessed a certain type of image and a second data that indicates how many times the image was edited and printed, and including a third data that indicates the dates and times that images were obtained from said WWW server;
a step of selecting link destinations in said link processing step based on the tabulation results of said record search step;
a step of setting the link destinations in the link processing step based on the selected link destinations;
a step of storing attribute data of users who have accessed images; and
a step of searching accessed images which have been accessed by the users belonging to a predetermined attribute within a predetermined range of dates and times, and selects images, which have an access count that is greater than a predetermined value, from said accessed images based on the access counts corresponding to said accessed images, respectively.

3. An image printing system comprising:
an image editing device that carries out editing and printing of images;
a link processing device that allows obtaining a desired image by linking to a WWW server that provides the image to be edited and printed in said image editing device;
a record search device that tabulates records of editing and printing processing that has been carried out using said image editing device on the images obtained from said WWW server, said records including at least one of a first data that indicates how many times each user has accessed a certain type of image and a second data that indicates how many times the image was edited and printed; and
a link destination selection device that selects link destinations in said link processing device based on the tabulation results of said record search device and reports this to said link processing device; and
a memory device that stores the attribute data of users who have accessed images, wherein
said link processing device sets the link destinations based on the link destinations reported from said link destination selection device,
said records include said second data, and
said record search device searches edited and printed images which have been edited and printed by the users belonging to a predetermined attribute within a predetermined range of dates and times, and selects images, which have an access count that is greater than a predetermined value, from said edited and printed images based on the edit and print counts corresponding to said edited and printed images, respectively.

4. An image printing system according to claim 3 wherein said records further includes a fourth data that indicates the dates and times that editing and printing processing was carried out by using said image printing device, and wherein said record search device searches edited and printed images which have been edited and printed by a plurality of users within a predetermined range of dates and times and selects images from said edited and printed images based on the edit and print counts corresponding to said edited and printed images respectively.

* * * * *